United States Patent [19]

Iggulden et al.

[11] Patent Number: 5,957,697
[45] Date of Patent: Sep. 28, 1999

[54] PRINTED BOOK AUGMENTED WITH AN ELECTRONIC VIRTUAL BOOK AND ASSOCIATED ELECTRONIC DATA

[75] Inventors: Jerry Iggulden, Santa Clarita; Christopher J. Husa, La Cañada; Ben Davidson, North Hollywood, all of Calif.

[73] Assignee: Ithaca Media Corporation, La Canada, Calif.

[21] Appl. No.: 09/199,927

[22] Filed: Nov. 25, 1998

Related U.S. Application Data

[63] Continuation-in-part of application No. 08/915,435, Aug. 20, 1997.
[51] Int. Cl.⁶ .................................................. G06F 17/30
[52] U.S. Cl. ........................... 434/317; 707/9; 345/350; 345/901
[58] Field of Search ............................... 434/307 R, 317; 707/500, 501, 513, 515, 530, 531, 9, 10, 104; 345/350, 901

[56] References Cited

U.S. PATENT DOCUMENTS

| | | | |
|---|---|---|---|
| 4,855,725 | 8/1989 | Fernandez | 345/173 |
| 4,966,285 | 10/1990 | Otake et al. | 206/455 |
| 5,188,533 | 2/1993 | Wood | 434/169 |
| 5,453,013 | 9/1995 | Billings et al. | 434/169 |
| 5,569,868 | 10/1996 | Leung | 84/600 |
| 5,597,307 | 1/1997 | Redford et al. | 434/118 |
| 5,624,265 | 4/1997 | Redford et al. | 434/307 R |
| 5,832,472 | 11/1998 | Sheppard, II | 707/1 |

OTHER PUBLICATIONS

"Action Products Int'l Introduces Educational Book/Software Products," New Product Release @ http://www.techmall.com/techdocs/NP970827–1.html, two pages, Aug. 1997.

"Action Products Int'l to Introduce New Book Series This Spring," Press Release @ http://www.apii.com/ir/press/031497–2pr.html, Mar. 1997.

"Action Products Int'l Unveils Its Growth Plan and New Products," Press Release @ http://www.apii.com/ir/press/052897pr.html, May 1997.

Magdy F. Iskander et al., "Interactive Multimedia Lessons for Education," SBMO/IEEE MTT–S IMOC '95 Proceedings, pp. 693–700.

OmniMedia Digital Publishing, Our Approach to Electronic Book Publishing, <http://www.awa.com/library/omnimedia/abouteb.html>, date unknown.

G.J. Ritchie et al., "Text Referencing Within Computer–Based Tutorials", IEE Colloquium on Human–Computer Interface Design for Multimedia Electronic Books, 1995, pp. 1–3.

B.C. Pobiak, "Adjustable Access Electronic Books", Proceedings of the Johns Hopkins National Search for Computing Applications to Assist Persons with Disabilities, 1992, pp. 90–94.

Howard Falk, "E–books and e–zines", The Electronic Library, vol. 13, No. 6, Dec. 1995, pp. 578–581.

Interfact™ product brochure and order form from World Book, Inc. and Two–Can Publishing Ltd., date unknown.

Web Gallery, a web page, by Prentice Hall (www.prenhall.com), date unknown.

Interactive Course Series, a web page, by Waite Group Press, a division of Macmillan Computer Publishing (www.waite.com), date unknown.

*Primary Examiner*—Paul V. Kulik
*Attorney, Agent, or Firm*—Blakely, Sokoloff, Taylor & Zafman LLP

[57] ABSTRACT

A system and method for augmenting a printed text with electronically stored data in the form of images, sounds and/or supplemental text. A printed book contains a plurality of pages of text. An electronic virtual book emulates the appearance of the printed book. The virtual book may only be accessed with a password that is contained in the printed book. The text of the book is augmented with information linked to the virtual book, including, for example, vocalization of the text of the book.

20 Claims, 2 Drawing Sheets

PRINTED BOOK AUGMENTED WITH AN ELECTRONIC VIRTUAL BOOK AND ASSOCIATED ELECTRONIC DATA

RELATED APPLICATIONS

This is a continuation-in-part of co-pending application Ser. No. 08/915,435 filed Aug. 20, 1997.

BACKGROUND OF THE INVENTION

1. Field of the Invention

The present invention relates generally to the field of multimedia publishing. More particularly, the invention pertains to a printed book, the text of which is augmented with associated electronic data stored in a remotely accessible server.

2. Prior Art

As the home computer has matured, there has been a veritable explosion in "multimedia publishing". A vast array of software titles are now available to the computer owner which combine text, images and sounds to provide a multimedia experience. Widespread penetration of CD-ROM drives into home computers has accelerated this process. Multimedia content is also available via the Internet, particularly the World Wide Web.

The public's enthusiasm for computer-based multimedia experiences is seen by many as a threat to more conventional forms of publishing, particularly book publishing. Nevertheless, the experience of reading a book cannot be duplicated with electronic media and reading remains a pleasurable pastime for a great many persons, whether or not they also engage in computer-based entertainment.

There have been several approaches to combining computer-based multimedia experiences with a separate printed text. One particular approach relates to training and educational subjects where a printed course book is provided in combination with multimedia content stored locally on a hard disk, floppy disk or CD-ROM, or remotely accessible via the Internet.

U.S. Pat. Nos. 5,597,307 and 5,624,265 to Redford, et al. disclose a printed publication having associated electronic content. The printed publication contains one or more buttons which actuate a remote control transmitter within the book. A remote control receiver is coupled to the reader's home computer system. Upon receipt of a remote control signal, electronic content associated with the text of the publication is downloaded from a remote server and presented to the reader on the home computer system.

SUMMARY OF THE INVENTION

The present invention provides a system and method for augmenting a printed text with electronically stored data in the form of images, sounds and/or supplemental text. A printed book contains a plurality of pages of text. An electronic virtual book emulates the appearance of the printed book. The virtual book may only be accessed with a password that is contained in the printed book. The text of the book is augmented with information linked to the virtual book, including, for example, vocalization of the text of the book.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
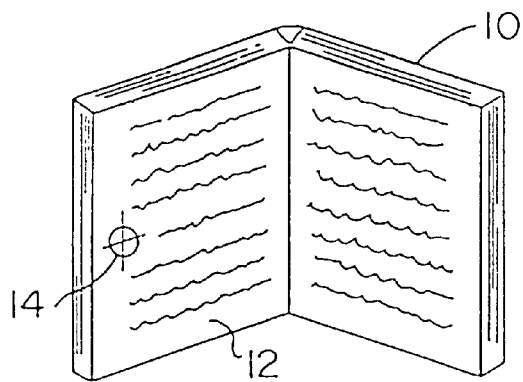
FIG. 1 illustrates a book printed in accordance with one embodiment of the present invention.

FIG. 1 shows a book 10 printed in accordance with the present invention. Book 10 is essentially like an ordinary book, having a plurality of pages 12 containing printed text. Book 10 may be a work of fiction or non-fiction. The subject matter of book 10 is not particularly relevant to the present invention, it being understood that the invention can be advantageously applied to virtually any type of book.

In addition to the normal printed text, book 10 is imprinted with graphic indicia 14 on at least one of pages 12. Indicia 14 appears in the immediate vicinity of text for which there is associated electronically stored data available for retrieval by the book reader. Indicia 14 may take many forms. For example, it may be a symbol or icon appearing in or near the margin of the page. The symbol or icon may be thematically related to the subject matter of the book, but this is not necessarily the case. An example of such a thematic relationship would be the use of a compass rose in a book related to exploration. If indicia 14 appears on a number of pages of book 10, each appearance of the indicia may be the same or slightly different. For example, a compass rose could be used with a pointer that points in a different direction for each appearance of the indicia. This can then be used to direct the reader to the appropriate electronically stored data as explained below.

Indicia 14 may be integrated with the text of the book. For example, one or more words of the text or the page number may be printed in boldface type or in a contrasting font or color. It is merely necessary that indicia 14 be readily apparent to the reader of book 10, but is preferably of a nature that it will not cause the reader undue distraction.

As indicated above, indicia 14 provides a visual cue to the reader that there is electronically stored data associated with the text in the vicinity of the indicia. Such data may be in the form of images, sounds, and/or supplemental text. Image data may comprise maps; or photographs showing locales referred to in the text, photographs or illustrations of characters referred to in the text, etc. Sound data may comprise narrations of the text, sound effects associated with events portrayed in the text, mood setting music, etc. Supplemental text data may comprise "sidebars" relating to the text, alternative accounts of events portrayed in the text, unabridged accounts of a condensed text, etc.

Certain types of supplemental text data are unique to the present invention. One example is a "running" synopsis. At various points throughout the printed text, the reader may be prompted to obtain an electronically stored synopsis of the story told up to that point. No information is revealed concerning events that take place beyond the page where the reader accesses the electronically stored data. The synopsis may include the cast of characters introduced thus far, a chronology of events or various other summaries. The reader need not be prompted with graphic indicia to utilize this feature. The electronically stored synopsis may be arranged to be accessed at any corresponding point within the printed text. This can be accomplished by simply entering the page number of the printed text following an appropriate prompt in the user interface.

Figure 2:
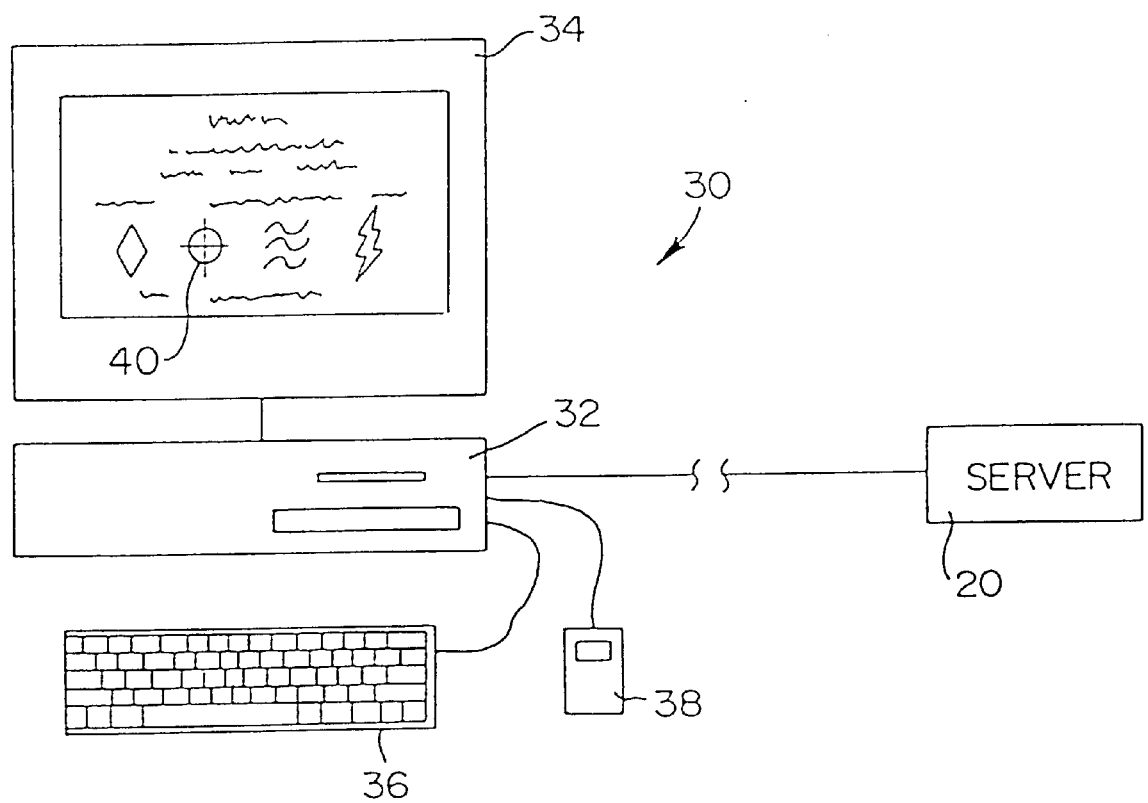
FIG. 2 illustrates a graphical user interface for retrieving text-relited data in accordance with one embodiment of the present invention.

Referring next to FIG. 2, the image, sound and/or supplemental text data associated with portions of text in book 10 are stored in a data storage device such as a remote data server 20; however, the invention is not limited in this regard. The data storage device may be local to the client computer in the form of a hard disk, floppy disk, CD-ROM or other data storage medium. In the presently preferred embodiment utilizing remote data server 20, remote access to the server is preferably provided via the World Wide Web. A client computer 30 belonging to the reader of book 10 comprises a processor unit 32, display 34, keyboard 36 and a mouse or equivalent pointing device 38.

To access the data stored in server 20, the reader must first log on to the server. This is accomplished in a conventional manner, but may require validation to ensure that the person logging on possesses a copy of book 10. Such validation may be accomplished by, for example, entering a serial number printed on book 10. Once the reader has successfully logged on, a graphical user interface is presented on display 34. This interface is preferably constructed as a web page using conventional programming techniques. A variety of web pages, each associated with a particular book title, are preferably provided by server 20. The web page for book 10 includes graphic indicia 40 that are visually correlated with the graphic indicia 14 appearing in book 10. To retrieve the data associated with the text in the vicinity of indicia 14, the reader uses pointing device 38 to select indicia 40. Such selection may be accomplished by "clicking on" indicia 40, and may include or be followed by manipulation of the indicia as described below. The reader's actions with respect to indicia 40 are communicated to server 20 which retrieves the associated data and transmits it to processor unit 32. The data is presented to the reader by computer system 30 in the form of images, sounds and/or supplemental text.

It is not necessary that indicia 40 be identical to indicia 14, as long as there is a sufficient visual correlation between the two that the reader can unambiguously select the appropriate indicia. If every appearance of indicia in book 10 is a unique symbol or icon, corresponding symbols or icons are provided on the web page. Alternatively, a commonly formatted symbol or icon may be used throughout book 10. In this case, the web page would be constructed so that indicia 40 leads the reader to further selection options. For example, if indicia 14 is in the form of a compass rose, each appearance of indicia 14 in book 10 may have a pointer pointed in a different direction. The reader would then select indicia 40 on the web page and, using pointing device 38, would rotate the pointer to the proper orientation. Alternatively, indicia 40 may have a "pull-down" menu of various page numbers corresponding to the page numbers in book 10 on which indicia 14 appears.

Figure 3:
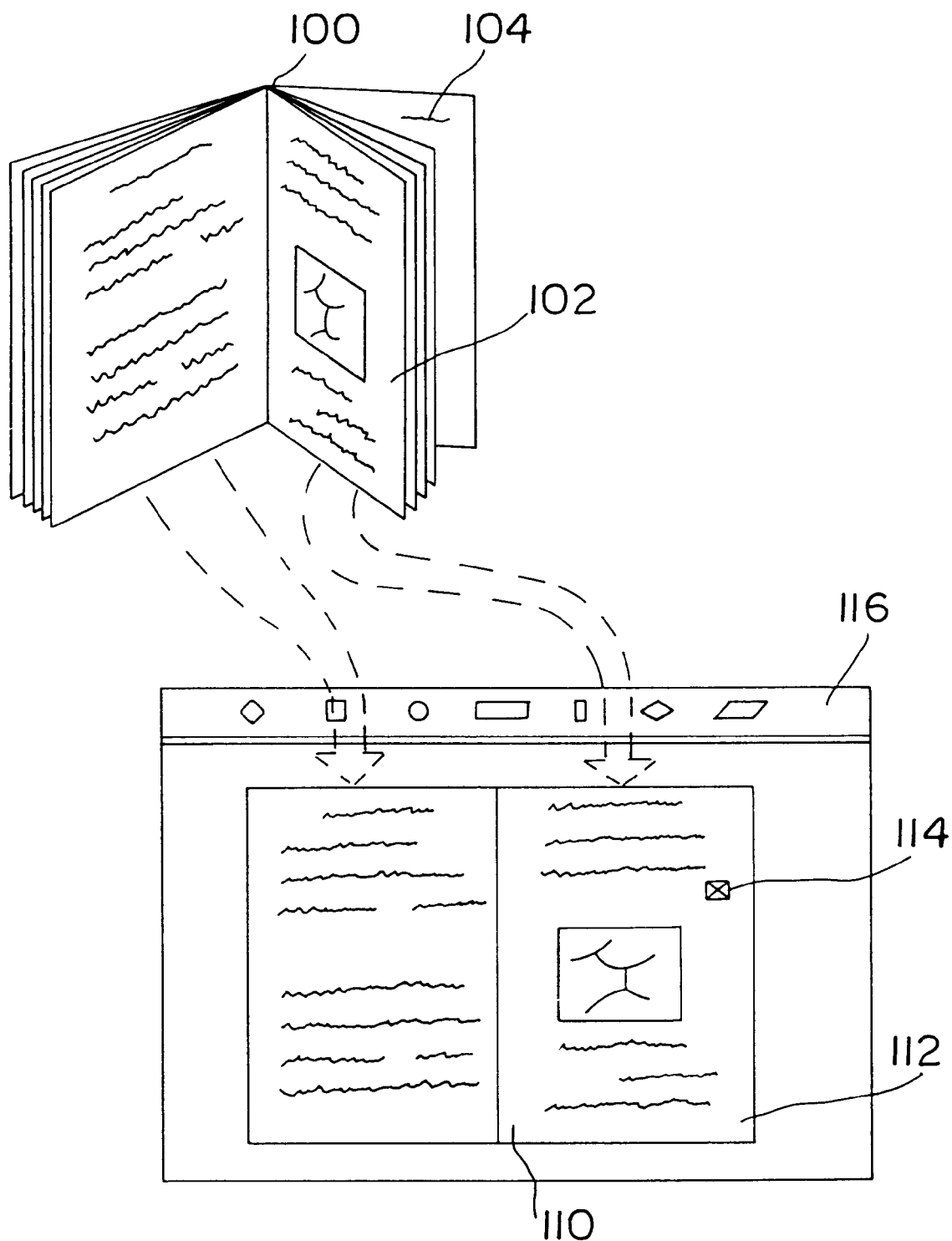
FIG. 3 illustrates an alternative embodiment of the present invention.

FIG. 3 illustrates an alternative embodiment of the present invention. Like book 10 of the previously-described embodiment, book 100 is essentially like an ordinary book, having a plurality of pages 102 containing printed text. The book may include graphic indicia as previously described, but such indicia are not necessary to this embodiment of the invention.

Book 100 includes a password 104. The password may be imprinted on or in the book itself or may be printed on an insert that is included with the book at the time of purchase. The password may be common to all copies of book 100, but is preferably unique to each copy. The password preferably comprises a string of alphanumeric characters.

Password 104 is used by the purchaser of book 100 to access a web site or equivalent source of computer-based information related to book 100. One of the principal features of the web site is a "virtual book" 110. The virtual book is an electronic image of book 100 that preferably reproduces the appearance of book 100 in all significant respects, e.g., virtual pages 112 preferably contain the same text as corresponding pages 102 in the same font and with the same pagination.

While the text of book 100 may be read directly from virtual book 110, the virtual book is not intended as a replacement for the printed book. Instead, book 110 provides a convenient graphical user interface for the reader to link to or otherwise access additional information related to the textual content of the book. Pages 112 of virtual book 110 may include graphic indicia 114. Corresponding graphic indicia may be included on pages 102 of the printed book, but such are not necessary in this embodiment of the invention. As in the previously-described embodiment, indicia 114 may be integrated with the text of virtual book 110 in a manner that is already commonly used in web sites. For example, certain words of the text may be in boldface type, in a contrasting font or color or underlined. Such indicia provide a visual cue to ache reader that there is additional information related to the text, as well as a convenient means for accessing such information. Selecting the indicia 114 with a cursor provides a link to the associated information as is well-known in the art of web site design. The web site may also include other interface elements, such as a tool bar 116.

One of the features that may be provided with virtual book 110 is vocalization of the text. This may be accomplished with a digitized recording or by any of the conventionally known means of speech synthesis. Vocalization of the text may be controlled with tool bar 116 and may be accompanied by a visual cue, such as a moving cursor or the like on virtual pages 112. As text vocalization proceeds, links to associated information may be automatically enabled with appropriate pauses in the vocalization while the information is presented. Vocalization may then continue automatically after the pause or may be resumed by an operator action. The net effect is an automatic multimedia presentation of the book.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for augmenting a printed text with electronically stored data comprising the steps of:

providing a printed book having a plurality of pages of text;

providing a password with the printed book;

providing access to an electronic facsimile of the printed book upon use of the password;

displaying at least one page of the electronic facsimile, said page being formatted to appear substantially identical to a corresponding page of the printed text, said page of the electronic facsimile including a linking indicator embedded therein;

designating said linking indicator on the electronic facsimile;

providing access to a data storage device storing data associated with said linking indicator; and presenting said data stored in the data storage device.

2. The method of claim 1 wherein the password is printed in the printed book.

3. The method of claim 1 wherein the password comprises a word of text within the printed book.

4. The method of claim 1 wherein said data associated with the linking indicator comprises text.

5. The method of claim 1 wherein said data associated with the linking indicator comprises an image.

6. The method of claim 1 wherein said data associated with the linking indicator comprises a sound.

7. The method of claim 6 wherein said sound comprises a vocalization of the printed text.

8. The method of claim 7 further comprising the step of automatically linking to additional stored data associated with a portion of the printed text as said portion of the printed text is vocalized.

9. The method of claim 1 wherein said data storage device storing data associated with the linking indicator is accessed via a global computer network.

10. The method of claim 1 wherein said electronic facsimile of the printed book is accessed by a global computer network.

11. A system for augmenting a text with electronically stored data comprising:

a printed book having a plurality of pages of text, said printed book including a password;

means for providing access to an electronic facsimile of the printed book upon use of the password;

means for displaying at least one page of the electronic facsimile, said page being formatted to appear substantially identical to a corresponding page of the printed text, said page of the electronic facsimile including a linking indicator embedded therein;

means for designating said linking indicator on the electronic facsimile;

means for accessing to a data storage device storing data associated with said linking indicator; and means for presenting said data stored in the data storage device.

12. The System of claim 11 wherein the password is printed in the printed book.

13. The System of claim 11 wherein the password comprises a word of text within the printed book.

14. The system of claim 11 wherein said data associated with the linking indicator comprises text.

15. The system of claim 11 wherein said data associated with the linking indicator comprises an image.

16. The system of claim 11 wherein said data associated with the linking indicator comprises a sound.

17. The system of claim 16 wherein said sound comprises a vocalization of the printed text.

18. The system of claim 17 further comprising means for automatically linking to additional stored data associated with a portion of the printed text as said portion of the printed text is vocalized.

19. The system of claim 11 wherein said data storage device storing data associated with the linking indicator is accessed via a global computer network.

20. The system of claim 11 wherein said electronic facsimile of the printed book is accessed via a global computer network.

* * * * *

UNITED STATES PATENT AND TRADEMARK OFFICE
CERTIFICATE OF CORRECTION

PATENT NO. : 5,957,697
DATED : September 28, 1999
INVENTOR(S) : Iggulden et al.

It is certified that error appears in the above-identified patent and that said Letters Patent is hereby corrected as shown below:

On title page,
Item [73], Assignee, please delete "La Canada" and insert -- La Cañada --.

Item [56], Other Publications, please italicize the "Web Gallery" and "Interactive Course Series" headings of the last two publications.

Column 1, line 66, please delete "text relited" and insert -- text related --.

Signed and Sealed this

Twenty-ninth Day of May, 2001

*Attest:*

NICHOLAS P. GODICI

*Attesting Officer*    *Acting Director of the United States Patent and Trademark Office*